A. F. Jones

Depurator,

No. 2,276, Reissued June 5, 1866.

Witnesses:

R. F. Campbell
O. Schafer.

Inventor:

Alfred F. Jones
by his Attys
Mann, Fennel & Hammond

AM. PHOTO-LITHO. CO. N.Y. (OSBORNE'S PROCESS.)

UNITED STATES PATENT OFFICE.

ALFRED F. JONES, OF LEXINGTON, KENTUCKY.

IMRROVEMENT IN VACUUM APPARATUS FOR TREATING DISEASES.

Specification forming part of Letters Patent No. 44,198, dated September 13, 1864; Reissue No. 2,276, dated June 5, 1866.

DIVISION A.

*To all whom it may concern:*

Be it known that I, ALFRED F. JONES, of Lexington, in the county of Fayette and State of Kentucky, have invented a new and useful apparatus, which I term a "Restorator," to be used in the Treatment of Diseases; and I do hereby declare that the following is a full, clear, and exact description thereof, reference being had to the accompanying drawings, making a part of this specification, in which—

Figure 1:
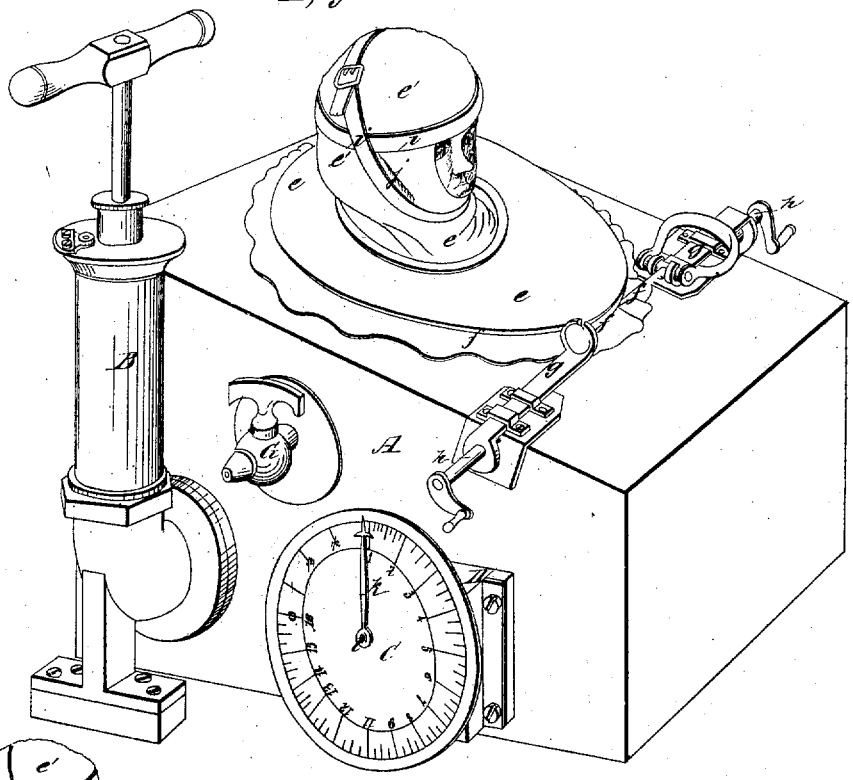
Figure 2:
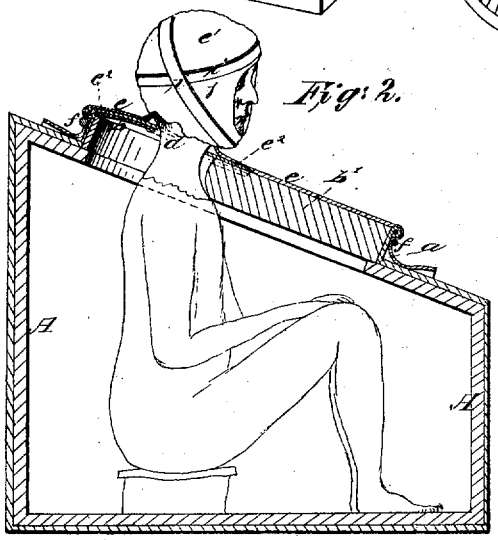
Figure 3:
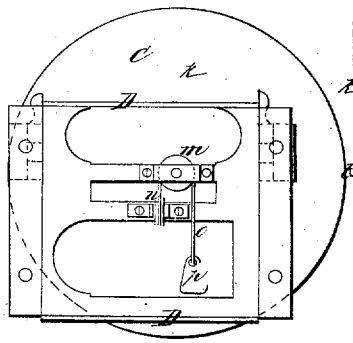
Figure 4:
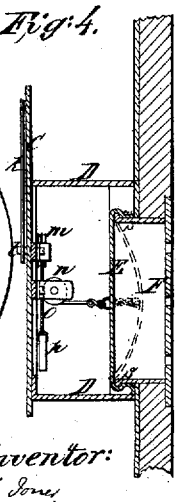

Figure 1 is a perspective view of my restorator. Fig. 2 is a vertical longitudinal section of Fig. 1. Figs. 3 and 4 show a gage which may be used for indicating the amount of rarefaction of the air within the restorator.

Similar letters of reference indicate corresponding parts in the several figures.

The object of this invention is to produce a uniform circulation of the fluids in the human body, and thereby induce a normal action of the secretory organs of persons who are afflicted with disease, by inclosing portions of the body within an air-tight chamber and then exhausting air from this chamber, thereby exposing that portion of the body which is confined within the chamber to a lighter atmosphere than that which is taken into the lungs, as will be hereinafter described.

To enable others skilled in the art to understand my invention, I will describe its construction and operation.

In the accompanying drawings, A represents a box, which may be constructed of wood or of metal, or of both of these materials combined, or other suitable material, and which may be of any desirable shape or capacity. For all ordinary purposes the box A may be made of sufficient size to contain an adult when seated in the position shown in Fig. 2. This box A is entered through an opening in its top, which opening is surrounded by a flange, *a*, that projects upward, and is constructed with a bead on its upper edge, as shown in Fig. 2. This opening into the box is provided with a cover which is adapted to fit snugly within the flange *a*, and this cover is composed of two parts, *b b'*, which are united together by a sliding fastening consisting of two tenons or tongues on the portion *b*, which enter holes that are made in the portion *b'*. When these two cover-sections are put together there is an opening between them, (lettered *d* in Fig. 2,) which receives the neck of the person sitting in the box, so that all that portion of the body below the neck can be inclosed within this box.

The cover *b b'* is adjusted in place after the person is comfortably seated within the box, the head being exposed, and as this cover does not hermetically seal the opening *d*, I employ a cape, *e*, which forms a part of a hood, *e'*, which incloses all that portion of the head of the person except the breathing organs and the face, as shown in Figs. 1 and 2.

The cape *e* extends over the flanged opening above described, and is drawn tightly around the flange *a* by means of a strong band, *f*, the ends of which are crossed after the parts are all adjusted in place and affixed to sliding plates *g g*, which are moved by means of screws *h h*, as shown in Fig. 1.

By means of the band *f* and the head-straps *i i* the box A can be rendered air-tight without any inconvenience to the person sitting in it. The bands *i i* draw the hood *e'* tightly about the head, so that air will not enter the box A through the face-opening in this hood, and the cushions *j j* serve to protect the ears from painful pressure by the head-bands.

If desirable, a cape, $e^2$, may be interposed between the surface of the cover *b b'* and the cape *e*, as shown in the sectional view, Fig. 2.

The capes and the hood should be made of some material which is impervious to air, and for which purpose india-rubber cloth will be found to answer.

Having thus described one mode by which a portion of the human body can be confined within an air-tight chamber, I will describe a method of exhausting air from this chamber and of determining the suction upon the person sitting in the chamber, or rarefaction of the air within the chamber.

B represents a common air-pump having a single barrel or cylinder, which is connected with the box A so as to communicate with the interior thereof. The air-pump may be connected permanently to the box A, or it may be so applied to this box that it can be detached at pleasure.

The drawings, Fig. 1, represent the exhausting-pump B applied permanently to the box A; but I do not confine myself to such an arrangement, as various modes of exhausting air from the box A may be adopted.

C represents a dial-plate which is properly graduated on its face, and *k* is an index-hand or pointer, which points to the numerals indicated on the dial-plate C, and which is suitably attached to a stem, *l*, that carries a pulley, *m*. The pulley *m* is inclosed by the box D, which is affixed on one side of the box A, as shown in Figs. 1 and 4. Beneath the pulley *m*, and arranged at right angles to this pulley, is another pulley, *n*. From the pulley *m* depends a cord, *o*, carrying a weight, *p*. This cord passes over pulley *m* and under pulley *n*, and is attached to an elastic head, E, which is drawn tightly over the flange *s* that surrounds an opening, F, through the side of the box A.

When the pump B is put into operation the pressure of the external air will force the elastic head E inward, as indicated in red lines, Fig. 4, and thus cause the loaded cord *o* to rotate the pulley *m* and to move the index-hand *k* a greater or less distance, according to the amount of depression of the head E. By this form of gage the operator can determine the condition of the air within the chamber which contains a portion of the body under treatment.

When the suction or rarefaction of the air in the box becomes too great the stop-cock G is opened and air allowed to enter the box A until the person sitting in it feels comfortable.

My apparatus or my treatment operates upon the human system as an alterative, there being two atmospheres of different densities applied to the body at the same time, that which surrounds the body within the confined chamber being light, while that which is taken into the lungs is heavy or of the natural density. Thus the pressure which is removed from the surface of the body by partially exhausting the air from the box or chest A, together with the common atmosphere which is taken into the lungs, forces the blood to the extremities, or toward that part from which the pressure of the atmosphere is partially removed, thus breaking up congestions and equalizing the nervous forces.

An artery, a vein, and a nerve are always associated, and run side by side from the largest to the most minute vessels, and any derangement in one affects the other. Thus, where there is congestion or accumulation of the blood at one point, from inflammation or any other cause, the nerves will suffer also and reflect their influence on the general system. If this congestion be broken up and the nerves be restored to their normal condition the cause will be removed and the patient be relieved.

The exhausted-air treatment operates on the system by diffusing and equalizing the nervous forces, thus restoring a more healthful action to the capillary circulation and stimulating the lymphatic absorbents to take up the morbid secretions.

In the above description I have shown how very portion of the human body except the breathing-passages can be confined within an air-tight chamber and the air exhausted from said chamber; but in some cases of treatment, where, for instance, the disease is local, I desire to confine in said chamber only that portion of the body which is affected with disease; and for this purpose the hood *e'* may be dispensed with and the cape *e* secured in any convenient manner around that portion of the body which enters the chamber. Nor do I desire to confine myself to the use of the cape *e*, as it is obvious that other contrivances or modes might be employed which will effectually close the passage about that portion of the body which is introduced within the chamber from which air is to be exhausted.

The gage which I have represented and described is intended to prevent any injurious effects from arising in consequence of exhausting too much air from the air-tight chamber, and increasing the suction or rarefaction of the air to such extent as to endanger suffocation or hemorrhage. But as the patient can in almost all cases determine when the suction or rarefaction is too great upon him, a gage may be dispensed with, though I prefer to avail myself of its use.

It will be seen by the aforegoing description of my mode of treating certain human diseases that the principle involved in my invention is the simultaneous application to the human body of two atmospheres, the one being of greater density than the other, and this while the whole body or any considerable portion thereof, or one or another of its limbs, is confined in an air-tight chamber from which the air is more or less exhausted.

I am aware that cupping-dishes and other devices acting like them have been applied to a limited portion of the human body for drawing blood therefrom in the treatment of diseases; but this I do not claim.

I am also aware that the idea of treating diseases by relieving the whole or any considerable portion of the human body of a part of the natural atmospheric pressure has been long since suggested, but without sufficiently describing any practical means of carrying the same into effect. I do not claim a patent for this broad idea; but

What I claim under this division of my reissue, and desire to secure by Letters Patent of the United States, is—

The use of the means above set forth, consisting of a receptacle, A, in combination with a cape, *e*, or its equivalent, for rendering such receptacle air-tight when to be used for inclosing any portion of the human body, substantially in the manner and for the purpose above described.

ALFRED F. JONES.

Witnesses:
JNO. W. KARRICK,
JOHN A. FORD.